Oct. 16, 1945.   B. W. WETHERBEE   2,386,761
METHOD OF MANUFACTURING ENDLESS POWER TRANSMISSION BELTS
Filed March 18, 1943
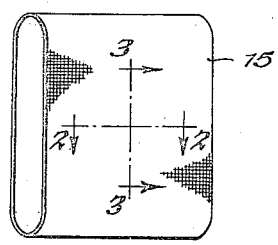
Fig. 1.
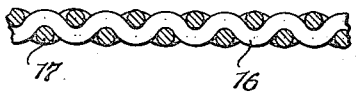
Fig. 2.
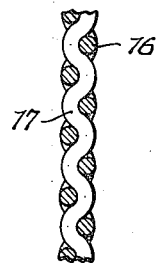
Fig. 3.
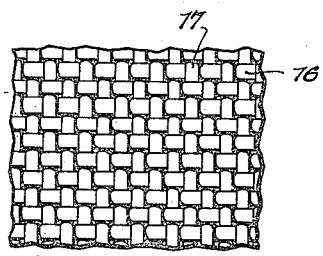
Fig. 4.
Fig. 5.
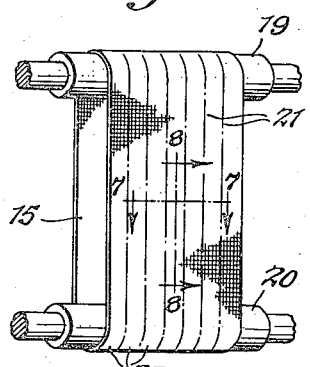
Fig. 6.
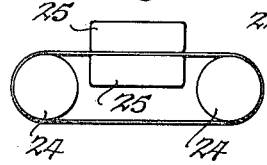
Fig. 9.
Fig. 7.
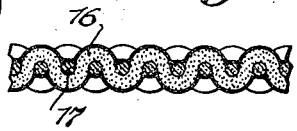
Fig. 10. Fig. 8.
Fig. 13.
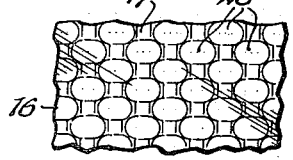
Fig. 12.
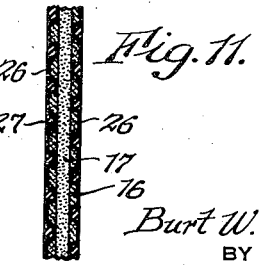
Fig. 11.
INVENTOR
Burt W. Wetherbee
BY
Powers & Gary
ATTORNEYS Patented Oct. 16, 1945

2,386,761

UNITED STATES PATENT OFFICE 2,386,761

METHOD OF MANUFACTURING ENDLESS POWER-TRANSMISSION BELTS.

Burt W. Wetherbee, Buffalo, N. Y., assignor to Globe Woven Belting Co., Buffalo, N. Y., a corporation of New York Application March 18, 1943, Serial No. 479,604

1 Claim. (Cl. 117—7)

This invention relates to a method of manufacturing endless power-transmitting belts, more particularly unjointed, woven fabric belts of the kind treated with rubber or rubber-like materials.

One object of the invention is to provide a belt of the character generally described which is inelastic and non-stretchable, yet highly flexible and of great tensile strength.

A further object is to provide a belt which is resistive to a high degree to wear and deterioration, this object contemplating a belt wherein relative movement between the woven elements is substantially eliminated and wherein the traction surfaces are wholly provided by other than those of said elements which are utilized in transmitting power from the driving member to the driven member.

A still further object is to provide a method for producing, at low cost and with standard equipment and fabric of conventional weave, belts having the characteristics noted.

The manufacture of belts in accordance with the invention is illustrated in the accompanying drawing wherein:

Figure 1 is a perspective view of a woven fabric tube which is adapted to be divided into a plurality of belts of a predetermined width.

Figure 2 is an enlarged fragmentary section taken along line 2—2 of Figure 1.

Figure 3 is a similar section taken along line 3—3 of the same figure.

Figure 4 is a fragmentary plan view.

Figure 5 is a view similar to Figure 2, showing the tube after it has been immersed in the treating solution.

Figure 6 is a perspective view illustrating the manner in which the treated tube may be stretched when the moisture content is of the correct value.

Figure 7 is an enlarged section taken along line 7—7 of Figure 6.

Figure 8 is a similar section taken along line 8—8 of the same figure.

Figure 9 is a diagrammatic view illustrating the operation in which the belts produced from the tube are press-cured.

Figures 10 and 11 are enlarged transverse and longitudinal sections, respectively, through a belt after the pressing-curing operation.

Figure 12 is a fragmentary plan view of the belt after the same operation.

Figure 13 is a perspective view of a belt produced in accordance with the method.

Although not necessarily so limited, the method lends itself particularly to the manufacture of single-ply belts. In the production of such belts fabric tubes woven on looms in accordance with conventional practice may be employed. Such a tube is indicated at 15 in Figure 1, the length of the tube being such that it may be divided into a plurality of belts of a predetermined width. In this connection it will be noted that the warp elements 16 of the tube become the transverse elements of the belts produced from the tube while the convolutions of the filler element 17, which is in the form of a continuous spiral, provide the longitudinal or load-carrying elements of the belts. While the warp and filler elements may be of the same size and spacing, it is preferred that the former be more closely spaced than the latter, the ratio between the warp elements and filler elements (with respect to the number of elements per inch of the original fabric), for example, being fifteen to thirteen. The yarn employed is preferably soft and loosely twisted, that employed for the filler being slightly smaller and of a better grade than that utilized for the warp and both filler and warp yarns preferably being crimped in substantially the same degree.

The woven tube is first treated to impregnate the elements and fill the spaces between them with a rubber or rubber-like material having the necessary bonding and friction-providing properties. For example, the tube may be immersed in a bath consisting of an aqueous dispersion of rubber compounded with vulcanizing and such other agents as may be required to impart the desired characteristics to the belts, the solids preferably constituting 30% of the bath. When the tube has become thoroughly saturated it is removed from the bath, at which time it will be impregnated with solids and liquids from the bath in an amount of the order of 198% of the dry weight of the fabric, the liquid (water in this instance) being present in the amount of 139% of the dry weight of the fabric and the solids originally present in such liquid.

After removal from the latex bath the fabric tube is then suspended in any suitable manner and warm air is caused to circulate around it to effect the removal of water by evaporation. This drying operation is continued until the water content reaches a value of the order of 28.7% of the weight of the dry fabric and the solids with which the fabric is impregnated. As the water content approaches this value syneresis of the latex approaches a stage at which the rubber particles 18 (Figure 5) enter a gel phase, the rubber in this phase being in the form of a plastic coagulum and being inelastic.

When the water present in the fabric has been reduced to the value indicated, the tube is stretched to straighten and elongate the filler yarn. To this end the tube 15 may be arranged upon stretching rolls 19 and 20 which may be biased apart in any suitable manner and which are preferably continuously driven. In this operation the circumferential extent of the tube 15 is increased to approximately 120 per cent of its original dimension wholly to remove the crimp (Figure 8) originally present in the filler yarn 17 (Figure 3), the tension under which the tube is placed in the stretching operation being substantially greater than that required to effect the removal of such crimp. Thereby the fibers of the filler yarn are oriented, being caused to assume parallel linear positions lengthwise of the yarn. Orientation of the fibers of the yarn in the manner described enables the straightened yarn elements to be elongated substantially and causes the fibers to assume positions which increase substantially their tensile strength and which render impossible any further elongation. It will be understood that the filler yarn tends to become smaller as tension is applied in the manner described and the fibers thereof are compressed. As the crimp which is removed from the filler yarn is transferred to the warp yarn, the crimp in the latter is increased by approximately one hundred per cent (compare Figures 5 and 7), the transfer of crimp from the filler yarn to the warp yarn causing the filler elements to move toward one another and the warp elements to move away from one another to change the ratio between the warp elements and filler elements, per inch, from fifteen to thirteen to thirteen to sixteen. The increase in the crimp in the warp yarn increases in substantial degree the interlocking action between the elements and increases the thickness of the fabric with relation to the size of the filler yarn while the increased separation of the warp yarn increases the flexibility of the fabric with respect to the length of the filler yarn.

As noted, the stretching operation is preceded by a drying step in which the moisture content is reduced to a predetermined value. By stretching the fabric when the latex is in the gel stage of the syneresis phase, the rubber is in a state which will permit compacting of the fibers of the filler yarn incident to the stretching operation without substantial exudence of the material with which the fabric is impregnated. Moreover, the latex, being plastic and inelastic at this time, offers substantially no resistance to elongation of the filler yarn and orientation of the fibers thereof. In the stretching operation, therefore, the re-alignment of the fibers of the filler elements is accompanied by a corresponding re-alignment of the rubber particles, the re-alignment of the rubber particles being effected before syneresis of the latex has progressed to the stage at which the rubber particles have assumed a definite permanent arrangement. In other words, the stretching of the fabric is carried out when the percentage of water present (of the order of 28.7% of the weight of the dry fabric and the solids with which it is impregnated) is adequate to facilitate, in the desired degree, orientation of the fibers of the filler yarn, but is less than the percentage at which the corresponding stage of syneresis would be inadequate to prevent exudence of the latex in the stretching operation but not below the percentage at which syneresis has advanced beyond the plastic stage. Thus by stretching the fabric only after syneresis of the latex has progressed to the stage indicated it is possible to obtain maximum elongation of the filler yarn, such elongation being substantially in excess of that which can be obtained either by stretching the untreated fabric when dry or by stretching the fabric when treated and dry or having a moisture content substantially less than that prescribed.

After stretching the fabric in the manner described, and while the tension applied in such operation is maintained, the final stage of drying is carried out. Thereby the water content present during the stretching operation is removed; and syneresis of the latex proceeds to completion, the tube thereupon being removed from the stretching rolls. The filler and warp elements and the fibers of such elements are thus securely bonded by the rubber in the relation they have been caused to assume in the stretching operation, the fabric structure, as modified, being illustrated in Figures 5 and 7. In connection with such modified structure it will be noted that with respect to the thickness of the fabric the elongated and linear filler elements 17 are located medially of, and inwardly a substantial distance with respect to, the planes of the two faces of the fabric.

Upon completion of the final drying stage and removal of the tube from the stretching rolls, the tube is divided into sections. For example, assuming that the tube 15 is 14 inches in length and that belts two inches wide are desired, then by cutting the tube along the lines indicated at 21 (Figure 6) seven belts 22 (Figure 13) can be obtained. Preferably in this operation the tube is cut along lines which follow the filler element 17. Although such lines will have a pitch corresponding to that of the said element, such pitch is so slight as to be unobjectionable and will be more than offset by the advantage which is obtained in reducing to one the number of ends of the filler element exposed on each marginal edge of the belt. If desired, the marginal edges of each belt may then be overcast as indicated at 23, it being understood that for many purposes for which the belts may be intended such overcasting will be unnecessary and hence may be dispensed with.

The belts 22, without being placed under tension, are then immersed in a second bath, similar in character to the first to thereby apply to them a heavy latex, or rubber-like coating, the coating applied by the second immersion operation entering the porous structure characteristic of the fabric after the stretching operation and serving to increase the strength of the original bonds between the filler and warp elements and at the same time providing the traction surfaces.

In the final operation the belts are placed upon suitable supporting rolls 24 (Figure 9) and are vulcanized in a press at a temperature of the order of 300° F. under a pressure of substantially 200 pounds per square inch for approximately three minutes, the press being sufficiently indicated for the purpose in view by a showing of the platens 25 thereof. In this operation the crests 26 (Figures 10, 11 and 12) of the warp elements are flattened out substantially, the original spaces between said crests being partially filled by the lateral displacement of a portion of the yarn of the crests and such spaces as remain being filled by the latex coating 27.

From the foregoing it will be apparent that by the method described a belt can be produced which is inelastic, non-stretchable, and of great strength. As a result heavy loads may be transmitted by the belt without vibration or elongation. The inelasticity of the belt has the further advantage that it reduces friction between the filler and warp elements and prevents overloading of the bonds provided by the rubber. As the load carrying elements of the belt are located along the flexing line of the belt midway between the planes of the traction surfaces and are inset with respect to such planes, the traction surfaces of the belt are provided wholly by the warp elements. The load carrying elements are thus protected from the wearing action of the driving and driven members. Thin, highly flexible belts may, therefore, be produced at low cost by the method, the use of special apparatus or of specially woven fabric or specially processed yarn being unnecessary.

I claim as my invention:

The method of preparing a woven fabric tube section for the manufacture of endless belts which includes the successive steps of immersing the tube section in an aqueous dispersion of rubber containing a vulcanizing agent to cause said dispersion to impregnate said tube section in an amount approximately equivalent to twice the weight of the dry fabric and including water in the order of 139% of the dry weight of the fabric and the solids originally present in such water, drying the tube section without substantial stretching until the water content remaining does not substantially exceed 28% of the weight of the tube section and rubber content, the water content being of a value at which syneresis of the rubber particles approaches a plastic-coagulum stage, stretching the tube section while the water content has said value in order to straighten and elongate the filler elements with resultant transfer of their crimp to the warp elements, thereby increasing the crimp of the latter, and orientation of the threads of the filler elements into substantial linear parallelism, thereby compressing the fibers of the filler elements and increasing the degree of mutual separation of the warp elements and thereafter further drying said tube section while it is so stretched in order to effect the removal of the moisture content and to consolidate the rubber content.

BURT W. WETHERBEE.